Nov. 11, 1969 T. J. GRUBER ET AL 3,477,546
LUBRICATING OIL PUMPING STATION AND MASTER CONTROL CENTER
FOR POSITIVE DISPLACEMENT TYPE METERING VALVES
Filed June 16, 1967 9 Sheets-Sheet 3

INVENTORS
THOMAS J. GRUBER
WILLIAM W. LYTH
BY Teagno and Toddy
ATTORNEYS

Nov. 11, 1969   T. J. GRUBER ET AL   3,477,546
LUBRICATING OIL PUMPING STATION AND MASTER CONTROL CENTER
FOR POSITIVE DISPLACEMENT TYPE METERING VALVES
Filed June 16, 1967   9 Sheets-Sheet 5

Fig. 9

TWO LINE SYSTEM
PILOTED OPERATED 4-WAY VALVE WITH LIMIT SWITCH

Fig. 11

TWO LINE SYSTEM
SOLENOID OPERATED 4-WAY VALVE WITH TWO PRESS. SWITCHES

Fig. 12

INVENTORS
THOMAS J. GRUBER
WILLIAM W. LYTH
BY
Teagno and Toddy
ATTORNEYS

TWO LINE SYSTEM
SOLENOID OPERATED 4-WAY VALVE WITH SHUTTLE PISTON AND PRESSURE SWITCH

Fig. 13

ONE LINE PROGRESSIVE SYSTEM
TIMED PUMPING ONLY WITH PRESSURE SWITCH FOR BLOCKAGE SIGNAL

Fig. 14

ONE LINE PROGRESSIVE SYSTEM
HALF CYCLE SHUT-OFF

Fig. 15

ONE LINE PROGRESSIVE SYSTEM
PILOT OPERATED 4-WAY VALVE WITH METERING CYLINDER AND LIMIT SWITCH

Fig. 16

INVENTORS
THOMAS J. GRUBER
WILLIAM W. LYTH
BY Teagno and Toddy
ATTORNEYS

ONE LINE-SPRING RETURN SYSTEM
PUMP AND PRESSURE SWITCH

Fig. 17

ONE LINE-SPRING RETURN SYSTEM
SOLENOID OPERATED 3-WAY VALVE
AND PRESSURE SWITCH

Fig. 18

ONE LINE-SPRING RETURN SYSTEM
PILOT OPERATED 4-WAY VALVE WITH
ONE PORT BLOCKED

Fig. 19

ONE LINE-SPRING RETURN SYSTEM
PILOT OPERATED 4-WAY VALVE SERVING
2 SETS OF INJECTORS

Fig. 20

ORIFICE TYPE SYSTEM
PUMP AND PRESSURE SWITCH-PUMP
RELIEVES INTERNALLY

Fig. 21

ORIFICE TYPE SYSTEM
PILOT OPERATED 4-WAY VALVE WITH
BLOCKED PORT

Fig. 22

INVENTORS
THOMAS J. GRUBER
WILLIAM W. LYTH
BY
Teagno and Toddy
ATTORNEYS

Fig. 23 — ORIFICE TYPE SYSTEM
SOLENOID OPERATED 3-WAY VALVE WITH PRESSURE SWITCH

Fig. 24 — ORIFICE TYPE SYSTEM
SOLENOID OPERATED 4-WAY VALVE WITH METERING CYLINDER

Fig. 25 — ORIFICE TYPE SYSTEM
PILOT OPERATED 4-WAY VALVE SERVING 2 SETS OF ORIFICES

INVENTORS
THOMAS J. GRUBER
WILLIAM W. LYTH
BY Teagno and Toddy
ATTORNEYS

INVENTORS
THOMAS J. GRUBER
WILLIAM W. LYTH
BY Teagno and Toddy
ATTORNEYS

United States Patent Office 3,477,546
Patented Nov. 11, 1969

3,477,546
LUBRICATING OIL PUMPING STATION AND MASTER CONTROL CENTER FOR POSITIVE DISPLACEMENT TYPE METERING VALVES
Thomas J. Gruber, Hunting Valley, Chagrin Falls, and William W. Lyth, Cleveland, Ohio, assignors to Eaton Yale & Towne Inc., Cleveland, Ohio, a corporation of Ohio
Filed June 16, 1967, Ser. No. 646,603
Int. Cl. F01m 1/12; F16n 7/14, 13/00
U.S. Cl. 184—7    10 Claims

ABSTRACT OF THE DISCLOSURE

An automatic lubricating oil pumping station comprising a reservoir, pump, reversing valve, four-way valve, and timer control for use in centralized lubrication systems. The timer control is designed to operate the pumping station to feed lubricant to all types of positive displacement metering valves including the parallel system valve, series system valve, and spring-return system valve.

BACKGROUND OF THE INVENTION

Field of the invention

This invention relates to centralized lubricating systems and in particular centralized lubricating systems utilizing positive displacement type metering valves operated in conjunction with a pump assembly and a lubricant reservoir.

Description of the prior art

All centralized lubricating systems comprise a basic package including a pumping unit, a reservoir from which the pump draws lubricant, a control circuit to operate the pump, and one or more metering valves to proportion lubricant to bearings or other surfaces to be lubricated. Over the years there has been a great deal of research and development performed in the area of the metering valve and in particular the positive displacement type metering valve. As a result, there are many types of positive displacement type metering valves offered in the marketplace today. Three of the most popular types of positive displacement metering valves will briefly be discussed.

The parallel system type of metering valve operates in conjunction with parallel lubricant lines. Alternate pressurizing of the lubricant lines produces movement of a measuring piston and a pilot piston within the valve block to thereby extrude a given amount of lubricant from the measuring valve. Reference is made to U.S. Patent No. 1,995,342 for a more complete description of the operation of the parallel system type of measuring valve.

A second type of measuring valve in widespread use today is the valve utilized in the series lubrication system. Reference is made to the Higgens Patent No. 2,834,433 for a more complete description of the operation of the series type of metering valve. Basically the series type of valve utilizes a single inlet lubricant line which line when pressurized activates a plurality of pistons within the valve block to thereby extrude controlled amounts of lubricant from the valve block.

The third type of lubricating valve in widespread use today is the spring-return system type of valve. The spring-return system valve utilizes a single lubricant inlet line much the same as the series system type of valve. However, unlike the series system type of valve, the spring-return system valve does not cycle completely with pressurization of the inlet line. In the spring-return system the piston within the valve performs a half-cycle of operation upon pressurizing of the inlet line; that is the piston travels down its respective bore but does not return to its initial position. Return of the piston to the initial or starting point is accomplished by means of a spring that is compressed during the initial operation of the valve and which spring thereafter returns the piston to its respective initial position.

The three types of positive displacement type measuring valve discussed above are in widespread use in centralized lubricating systems as marketed today.

With various types of measuring valves available, the purchaser of a centralized lubrication system must first decide on the type of valve that is best suited for his particular end use. The purchaser must also consider that the installation of a particular type of measuring valve will necessitate purchase of auxiliary equipment including pumps, reservoirs, and monitoring and control equipment. Purchase of this auxiliary equipment is significant in that the particular equipment is adapted to operate with a particular measuring valve. Therefore, the purchaser of a centralized lubrication system today must decide on a particular type of positive displacement measuring valve that will not only solve his present but also his future needs. The financial investment in the purchase of the related auxiliary equipment and the loss that would result should the purchaser change to a different design of positive displacement type measuring valve usually mean that once the system is purchased the customer is committed to a particular type of measuring valve.

SUMMARY OF THE INVENTION

The automatic oil pumping station of this invention will operate with any of the positive displacement type lubricating systems used in the machine tool industry today be it parallel, series or spring-return systems. This fully monitored master control center and pumping unit provides machine tool builders with a flexible oil pumping and control unit that will satisfy a broad variety of user specifications. It permits builders to standardize on inventory and installation while offering substantial saving in maintenance and inventory costs to users. The principal advantages of the oil pumping station of this invention are as follows:

(1) *Application flexibility.*—The oil pumping station of this invention will operate parallel, series, or spring-return type systems.

(2) *Unitized construction.*—The pump assembly, timer and corrosion proof reservoir of this invention are each easily removed and replaced as complete integrated units.

(3) *Three-step installation.*—Installation of the oil pumping station of this invention requires a simple four-bolt mounting of the oil pumping station, a connection of the lubrication system supply lines to the station, and a simple connection of an electrical lead.

(4) *Fully automatic operation.*—The oil pumping station of this invention is time clock controlled and therefore fully automatic.

(5) *Monitoring of system performance.*—Built into the automatic pumping station of this invention is a fault signal and optional machine shutdown contact.

(6) *Compact and lightweight.*—The automatic oil pumping unit of this invention combines a pump assembly, reversing valve, four-way valve, suction strainer, reservoir, and timer control in one easily mountable case.

BRIEF DESCRIPTION OF THE DRAWINGS

The preferred embodiment of the invention will now be described with reference to the attached drawings in which:

FIGURE 8 is a schematic diagram of the lubricant conduits between the reversing valve and the four-way valve of the oil pumping station of this invention, FIGURE 10 is a sectional view taken along the lines 10—10 of FIGURE 4, FIGURES 11-25 are schematic representations of the automatic oil pumping station of this invention as used with various types of positive displacement measuring valves including parallel or two-line system valves, one-line progressive system valves, one-line spring-return system valves, and orifice type system valves, FIGURE 26 is an elementary wiring diagram of the timer control of the preferred embodiment of this invention, FIGURE 27 is a sectional view of a one-line relief valve body as used with this invention, FIGURE 27a is an elevational view taken along the line 27a—27a of FIGURE 27.

DESCRIPTION OF THE PREFERRED EMBODIMENT OF THE INVENTION

Figure 1:
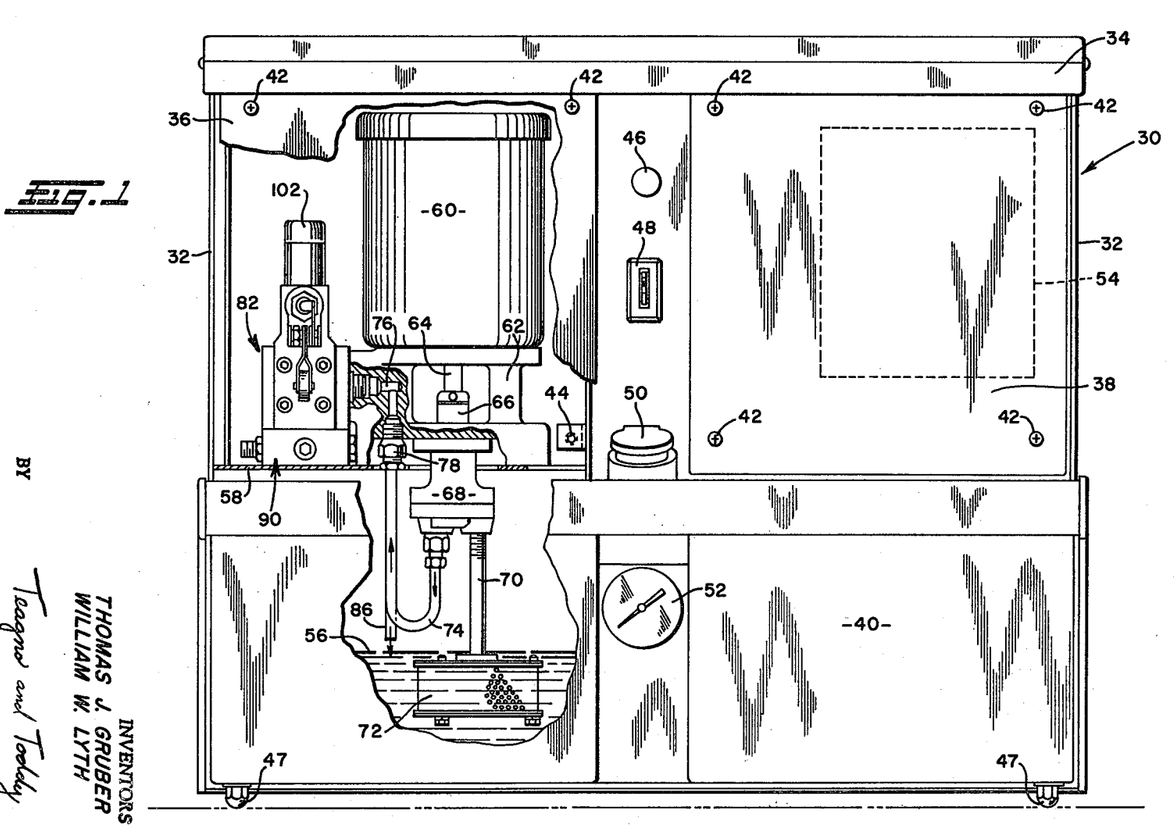
FIGURE 1 is a front elevational view, partly cut away and sectioned, of the automatic oil pumping station of this invention.

The preferred embodiment of this invention will now be described. In FIGURE 1 there is shown a front elevational view partly cut away and in section of the lubricating oil pumping station of this invention. There is shown in FIGURE 1, a pumping station 30 enclosed in a case 32 having sides, a top 34, front panels 36 and 38, and a reservoir compartment 40. Front panels 36 and 38 are removable as by unscrewing screws 42 received in tabs 44. The reservoir compartment 40 is likewise removable from the pumping station as by removing the nuts 47 from the bottom portion of the reservoir compartment. In the front of the pumping case there is shown in FIGURE 1 a fault light 46 and a control switch 48 for the purpose of energizing the pump of the station. An oil filler tube 50 provides access to the interior of the reservoir compartment 40 such that the reservoir may be filled by dispensing oil through the oil filler tube 50. A gauge 52 is provided in the reservoir in order to give visual indication of the depth of oil in the reservoir.

The pumping station case 32 including the side panels, top 34 and front panels 36, 38 may be fabricated from sheet metal or other suitable material. The reservoir compartment 40 can similarly be manufactured from sheet material although high density ethylene polymer construction is more desirable. The gauge 52 may be of any suitable type such as a float type level indicating gauge which will drive the gauge dial magnetically through the reservoir wall.

The interior of the pumping station is divided into two compartments, i.e. a pumping compartment behind the front panel 36 and an electrical timer control assembly compartment behind the front panel 38. The electrical timer assembly is shown schematically at 54 in FIGURE 1. This assembly may take the form of a printed circuit board with various plug-in relays, etc. attached thereto. An elementary wiring diagram of the electrical timer assembly 54 is shown in FIGURE 26 and will be described in greater detail hereafter. For purposes of describing the overall pumping station 30, it is felt sufficient to point out that the electrical timer assembly is physically located behind the front panel 38 and is bolted or otherwise secured to the interior of the pumping station case 32.

It should be noted at this point that the pumping station case 32 is designed to permit ready installation and removal of various of the components of the station including the pump assembly located behind the front panel 36 and the electrical timer control assembly located behind the front panel 38. Likewise, the reservoir 40 may be readily detached from the pumping station case by removing the nuts 47 allowing the reservoir compartment 40 to become unsecured with respect to the bottom portion of the pumping station case 32.

There is shown in FIGURE 1 an oil level 56 in the reservoir compartment 40. In the preferred embodiment of this invention the reservoir compartment is designed for a three gallon capacity.

Figure 2:
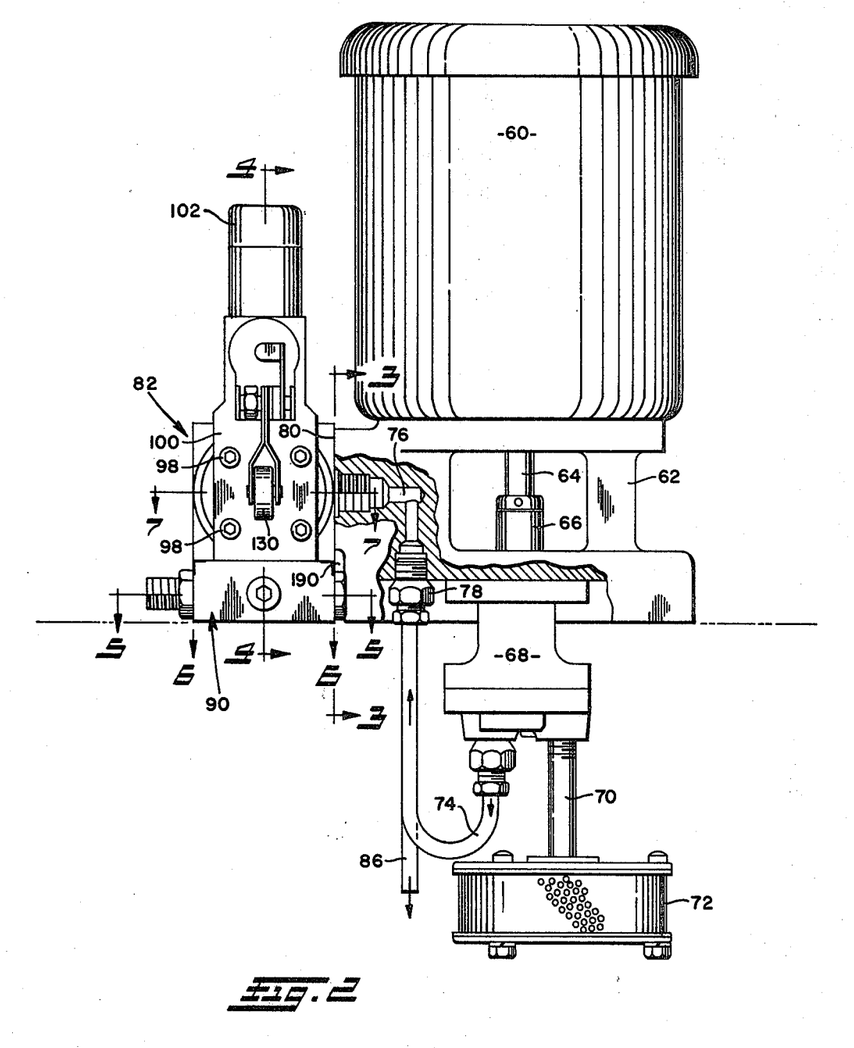
FIGURE 2 is a front elevational view partly in section of the integrated pump assembly of this invention.

The pumping unit of this invention will now be described by reference to FIGURE 2 wherein there is shown a modular package as mounted on the platform 58 of the casing 32 (FIGURE 1). The integrated pumping unit comprises an electric motor 60 bolted to a mounting bracket 62. The motor shaft 64 is attached to a bearing mounted shaft with a flexible rubber coupling 66. An oil pump 68 is secured to the bottom portion of the mounting bracket 62 and is driven by the electric motor 60. A pipe 70 extends from the pump suction inlet down into the reservoir terminating in a suction strainer 72. The relationship of the pipe 70, the suction strainer 72 and the oil level 56 may be seen in FIGURE 1. Oil discharge from the pump 68 is conveyed via the outlet pipe 74 to the passage 76 in the mounting bracket 62. Connection of the outlet pipe 74 to the mounting bracket 62 may be accomplished by several means known to those skilled in the art. A conventional coupling 78 is shown in FIGURE 2. Thus, the electric motor 60 in driving the oil pump 68 draws oil through the suction strainer 72 and thereafter pumps the oil through the outlet pipe 74 and into the passage 76 of the mounting bracket 62.

Secured to the face of the mounting bracket 62 is a four-way valve 82. For a better description of the face 80 of the mounting bracket 62, reference is made to FIGURE 3 wherein there is shown in greater detail the face 80 including the passage 76 intersecting said face 80. It is to be understood that the flow of oil is upward in FIGURE 3, through the outlet pipe 74, into the mounting bracket 62 and the right angle passage 76 and thereafter to the face 80 where communication is made with the four-way valve 82. To be described in greater detail hereafter is a relief passage 84 also provided in the mounting bracket 62. Connected to the under portion of the mounting bracket 62 is a relief pipe 86 generally parallel to the outlet pipe 74. As shown in FIGURES 2 and 1 the relief pipe 86 terminates in the reservoir compartment 40 and provides a means of transferring oil from the four-way valve 82 back to the reservoir 40.

Figure 3:
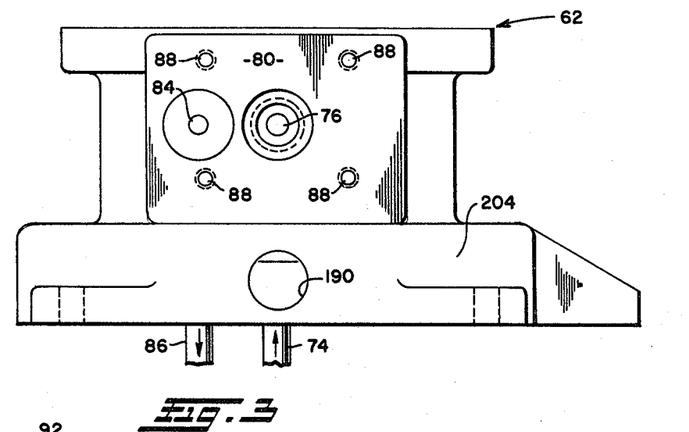
FIGURE 3 is a front elevational view taken along the lines 3—3 of FIGURE 2.

Attachment of the four-way valve 82 to the mounting bracket 62 may be accomplished by means of fasteners received in holes 88 provided in the face 80 of the mounting bracket 62. Sealing of the interface of the four-way valve 82 and the mounting bracket 62 may be accomplished, for instance, by means of O-ring seals or other seals, well known in the art, disposed in the face 80 or in the abutting face of the four-way valve 82.

In the preferred embodiment the electric motor 60 is a $\frac{1}{12}$ horsepower, 1,750 r.p.m. split phase totally enclosed motor. The oil pump 68 is a direct drive vaned rotor pump with 5.5 cubic inch per minute displacement. Greater or smaller displacement pumps may also be used. The suction strainer 72 of the preferred embodiment is rated at 40 microns.

DESCRIPTION OF THE FOUR-WAY VALVE

Figures 4, 10:
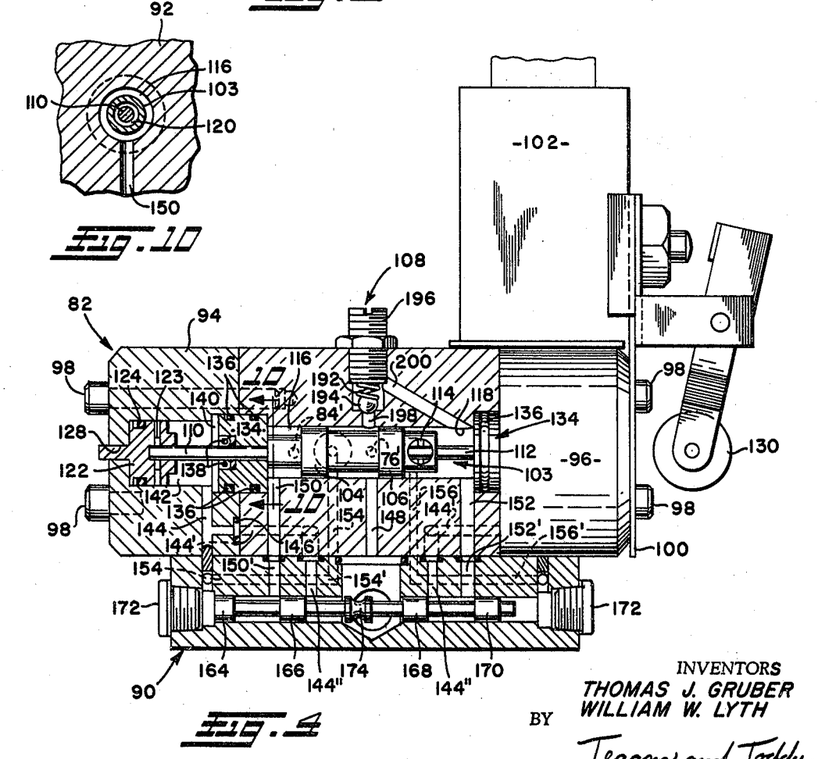
Figure 4:
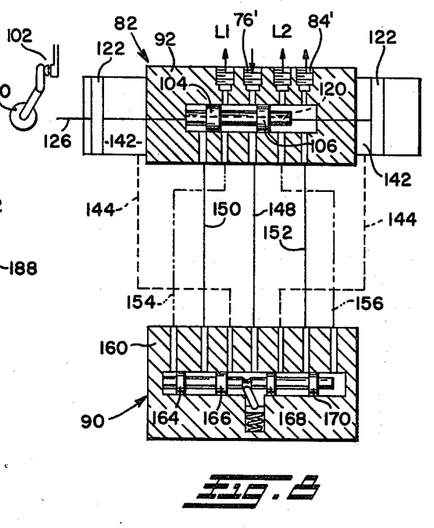
FIGURE 4 is a sectional view taken along the lines 4—4 of FIGURE 2.

Reference is made to FIGURE 4 wherein the four-way valve 82 of this invention will be described in greater detail. Bolted to the under portion of the four-way valve 82 is a reversing valve or pilot 90. At this time attention will be directed only to the four-way valve 82 comprising a main valve body 92 with end caps 94, 96 secured thereto. In the preferred embodiment as shown in FIGURE 4, fasteners 98 such as cap screws may be used to attach the end caps 94, 96 to the main valve body 92. It is to be understood that end caps 94, 96 are identical, and for ease of description, a cross-section of only one of the end caps is shown in FIGURE 4. Attached, however, to end cap 96 is a limit switch 102. Limit switch 102 has secured thereto a mounting tab 100 which may be secured to the end cap 96 by means of fasteners 98. The purpose of the limit switch 102 will be described in greater detail hereafter.

There is provided in the main valve body 92 a hollow two landed spool 103 having lands 104, 106 and an adjustable, spring loaded ball type relief valve 108.

The two landed spool 103 of FIGURE 4 is hollow. Loosely disposed within spool 103 is a rod having ends defining spool extension 110, 112. As shown in FIGURE 4 the spool rod may be secured to the spool by means of pin 114. Reference is now made to FIGURE 10 wherein there is shown a cross-section of the left hand portion of the spool 103 and in particular the relationship of the spool to the valve body 92. Note in FIGURE 10 the valve body 92, the annular space 116 between the spool and the valve body, a section of spool 103, a spool passageway 120 extending the length of the spool, and the spool extension 110.

While it should be understood that the spool extensions 110, 112 may be provided as an integral part of the two landed spool 103, the pin connection between a spool extension and the two landed spool both provides for ease of manufacture and also allows for correction of any minor misalignment of the spool in the spool bore 118 of the main valve body 92.

Disposed within each of the end caps 94, 96, is a piston 122. A connection between the spool extensions 110, 112 may be provided as shown in FIGURE 4 by means of a pin 123. It should be understood that there is an identical piston 122 in the end cap 96. Provided on the exterior surface of the piston 122 is an O-ring seal 124. Extensions 126 are provided on the pistons 122 and are received in a bore 128 provided in the end caps 94, 96. The bore 128 allows the extensions 126 of pistons 122 to protrude from the end caps 94, 96 when the pistons 122 are abutting their respective end caps. During a complete cycle of the two landed spool 103 of the four-way valve, the extension 126 of the right piston 122 will therefore protrude from the end cap 96 to contact a roller 130 of limit switch 102. Thus, there is positive indication of the complete cycling of the two landed spool of the four-way vlave of FIGURE 4. As shown in FIGURE 4 the limit switch 102 is mounted on the end cap 96. Because the pistons 122 are identical, it is to be understood that the limit switch 102 could be mounted on end cap 94. In fact, a pair of limit switches could be mounted; one each on end caps 94 and 96.

Providing a seal between the interior of the end caps 94, 96 and the spool bore 118 of valve body 92, is seal cartridge 134. Seal cartridge 134 is generally cylindrical in shape and includes a pair of sealing O-rings 136 on the exterior surface thereof. The spool extensions 110, 112 pass through cartridges 134. Sealing between the spool extensions 110, 112 and cartridges 134 is provided by means of O-rings 138 disposed in a counterbore of the cartridges 134. It should be understood that the spool extensions 110, 112 may reciprocate with respect to the cartridges 134. O-rings 138 provide sealing between the cartridges 134 and the spool extensions during reciprocation. In order to retain the O-rings 138 in the counterbore of cartridges 134, a retaining washer 140 may be disposed adjacent one end of cartridge 134 as shown in FIGURE 4. It should be understood that the seal cartridges 134 disposed on either side of the main valve body 92 are identical.

It will be evident from FIGURE 4 that there is defined by the respective pistons 122 and the seal cartridges 134 an expansion chamber 142 in each of the end caps 94, 96. It will be further evident that by introduction of a fluid into the expansion chamber that the pistons 122 will be caused to travel to the outer end of the respective end cap 94, 96 to thus produce movement of the two landed spool 103 in the main valve body 92. Thus, pressurization of the expansion chamber 142 in either of the end caps 94, 96 will cause the two landed spool 103 of the main valve body 92 to move either to the left or to the right.

Figure 9:
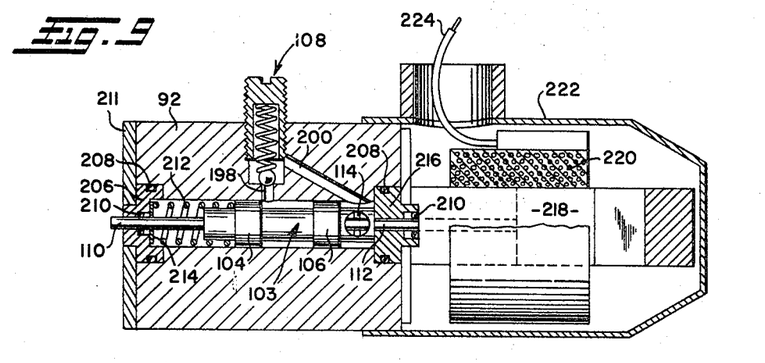
FIGURE 9 is a sectional view of a solenoid operated four-way valve of this invention.

While there has been described as the preferred embodiment of FIGURE 4 a hydraulically operated four-way valve comprising an expansion chamber in each of the end caps and a piston element 122, a solenoid operated four-way valve may also be used if desired. Such a solenoid operated four-way valve is shown in FIGURE 9 and will be described in greater detail hereafter. It will be aparent by a comparison of FIGURES 4 and 9 that solenoid operation of the four-way valve may be achieved by removal of the end caps 94, 96, removal of the seal cartridges 134, and the attachment of a solenoid operator to either or both of the ends of the main valve body 92. A more detailed discussion of this method of actuation of the four-way valve follows hereafter.

A right angle passage 144 is provided in each of the end caps 94, 96 in order to provide communication between a face of the end cap and the expansion chamber 142. An interconnecting passage 144' is defined in the main valve body 92 to provide communication from the bottom face of the valve body 92 to the expansion chamber 142 of the end cap 94. It should be understood that a similar passage 144' may be provided on the other side of the main valve body 92 to provide communication between the bottom face of the valve body 92 and the respective expansion chamber of end cap 96. Providing sealing communication between the respective passages 144, 144' is an O-ring 146 disposed in a counterbore of the respective end caps 94, 96.

Providing communication between the annular space between lands 104, 106 of the valve spool 103 and the bottom face of the valve body 92 is a passage 148. Similarly, passage 150 provides communication between the annular space to the left of land 104 and the bottom portion of the valve body 92, and passage 152 provides communication between the annular space to the right of land 106 and the bottom portion of the valve body 92. Also providing communication from the annular space between the lands 104, 106 of the valve spool and the bottom portion of the valve body 92 are the passages 154, 156. When the valve spool is in the left position of FIGURE 4, passage 154 will be in communication with the annular space between the lands 104, 106. Conversely when the valve spool of FIGURE 4 is in the right-hand position of FIGURE 4, passage 156 will provide communication from the space between the lands 104, 106 and the bottom face of the valve body 92.

Figure 7:
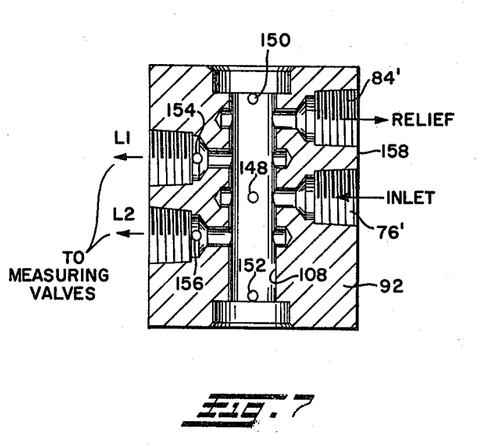
FIGURE 7 is a sectional view taken along the lines 7—7 of FIGURE 2.

Whereas the array of passages providing intercommunication between the reversing valve 90 of FIGURE 4 and the four-way valve 82 may be somewhat confusing, reference is made to FIGURE 8 wherein there is shown a diagrammatic representation of the passages interconnecting the reversing valve 90 and the four-way valve 82. Similar reference characters are used in FIGURE 8 as are used in the other figures. Similarly, reference is made to FIGURE 7 wherein a cross-section of the valve body 92 with the spool thereof removed is shown. Note that passages 148, 150, and 152 of FIGURE 7 are shown as drilled on the center line of the spool bore 120 of the valve body 92 whereas the passages 154, 156 are shown as drilled in an offset position from the center line of the spool bore 120 of the valve body 92. For proper orientation of FIGURE 7 it should be noted that face 158 of FIGURE 7 directly engages face 80 of FIGURE 3 to thereby provide intercommunication between the passage 76 of the mounting bracket 62 (see FIGURE 3) and the passage 76' of the valve body 92 (see FIGURE 7). Similarly, passage 84 (see FIGURE 3) and passage 84' (see FIGURE 7) are in communication when the valve body 92 is bolted to the face 80 of the mounting bracket 62. It should be remembered at this point that the flow of oil is from the oil pump 68 (FIGURE 2) through the outlet pipe 74, into passage 76, and thereafter into passage 76' of the valve body 92 (see FIGURE 7). Passage 84' of valve body 92 and passage 84 of the mounting bracket 62 provide a relief path for the flow of fluid into the relief pipe 86 leading to the reservoir 40.

Considering FIGURES 7 and 8, passages L1 and L2 lead to a two-line system positive displacement type measuring valve. For clarity the conduits between the measuring valve (not shown) and the valve block 92 have been omitted. It should be understood that conduits are attached to the block 92 by any suitable means known to those skilled in the art in order to provide a connection between passages L1 and L2 and a measuring valve.

From a review of FIGURE 8 it will be apparent that the purpose of the two landed valve spool 103 is to provide alternate communication of the inlet passageway 76' and the outlets L1 and L2. Thus, with the valve spool in the position of FIGURE 8, line L1 is pressurized. With the valve spool shifted to the right of FIGURE 8, the line L2 will be pressurized by inlet passageway 76'. While either of the lines L1 or L2 is pressurized, the other, non-pressurized, line (L2 or L1 respectively) will be in communication with the relief passageway 84' either directly (as by being located adjacent relief passageway 84') or indirectly via the spool passageway 120 in the hollow valve spool 103.

It will suffice to say at this point that the purpose of the reversing valve or pilot 90 is to shift the valve spool 103 from the left to the right or vice versa. A more complete description of the reversing valve or pilot 90 follows.

DESCRIPTION OF THE REVERSING VALVE 90

Figure 5:
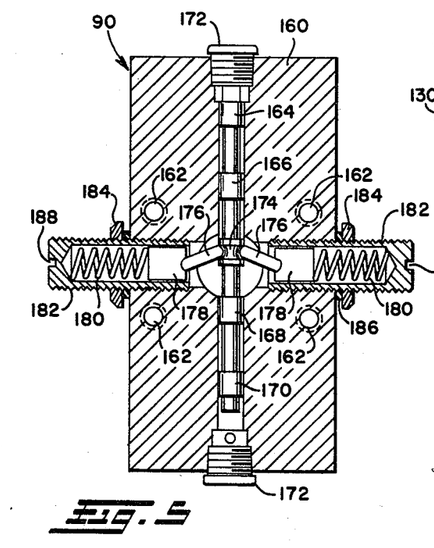
FIGURE 5 is a sectional view taken along the lines 5—5 of FIGURE 2.

Reference is made to FIGURE 4 wherein the reversing valve or pilot 90 is shown bolted to the under portion of the four-way valve 82. As may be more clearly seen in FIGURE 5, the reversing valve 90 comprises a reversing valve body 160 in which are defined a plurality of bolt holes 162 for the purpose of receiving fasteners securing the body 160 to the valve body 92. Disposed within a longitudinal bore or the reversing valve body 160 is a four landed valve spool having lands 164, 166, 168, and 170. Closing either end of the bore of the reversing valve body 160 are plugs 172.

An over-center detent mechanism in the reversing valve 90 maintains the four landed spool thereof in either the right-handed or left-handed position in FIGURE 4. As may be more clearly seen in FIGURE 5, the over-center detent mechanism comprises an annular bearing member 174 provided on the spool rod interconnecting the lands 166, 168. Disposed in the reversing valve body 160 on either side thereof are a pair of glands 182. Glands 182 are threadedly advanced into the reversing valve body 160 and may be adjusted by means of a suitable tool inserted in the slot 188. Disposed within the glands 182 are spring blocks 178 and springs 180. Links 176 are disposed between the blocks 178 and the annular bearing member 174 of the four landed valve spool. Retention of the glands 180 in the reversing valve body 160 may be insured by means of nut 184 and washer 186.

Spring tension on the links 176 may be adjusted by means of rotation of the glands 182. It will become apparent from a study of FIGURE 5 that the over-center spring detent mechanism limits positioning of the four landed spool of the reversing valve to the extreme left-handed or right-handed limits of movement. The ease with which the position of the four landed valve spool may be reversed is dependent upon the spring constant of the springs 180 as determined by the position of the glands 182 in the reversing valve body 160.

Figure 6:
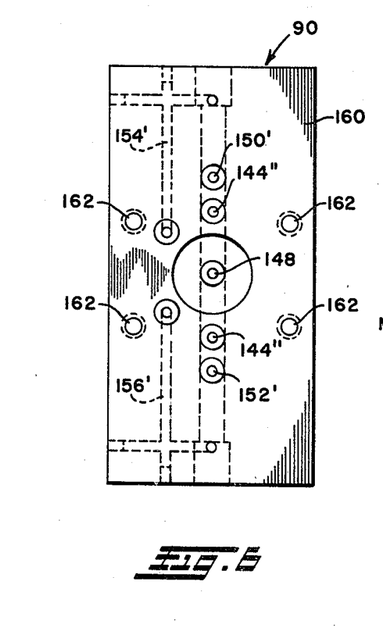
FIGURE 6 is an elevational view taken along the lines 6—6 of FIGURE 2.

Reference is made to FIGURE 4 wherein passages 154' and 156' are defined in the reversing valve body 160. These passages 154', 156' communicate directly with passages 154, 156 of valve body 92. Similarly, passages 150' and 152' of the reversing valve body 160 are in sealing communication with passages 150 and 152 of the valve body 92. Passages 144" of the reversing valve body 160 correspond with passages 144' of the valve body 92. Reference is made to FIGURE 6 wherein the face of the reversing valve body 160 in contact with the under portion of the four-way valve body 92 is shown. Sealing O-rings may be provided in the face of the reversing valve body 160 to provide sealing communication of the respective passageways in the reversing valve body 160 and the four-way valve body 92. For ease of identification of the respective passages the over-center detent mechanism and the four landed valve spool of the reversing valve are not shown in FIGURE 6.

OPERATION OF THE FOUR-WAY VALVE AND THE REVERSING VALVE

A description of the operation of the four-way valve 82 and the reversing valve 90 will now be made with reference to FIGURE 8. It should be kept in mind that FIGURE 8 is a diagrammatic representation of the passages interconnecting the respective four-way valve 82 and the reversing valve 90. The line drawing of the respective passages greatly simplifies the description of the operation of the four-way valve and the reversing valve. For a more complete description of the actual passages as drilled in the respective bodies of the four-way valve and the reversing valve reference is made to FIGURES 4-7. It should also be noted that the position of the passages 76', 84', L1 and L2 of the four-way valve 82 of FIGURE 8 are shown for purpose of description only. Reference is made to FIGURE 7 wherein the actual location of these passages is shown in the valve body 92 of the four-way valve body 92.

Upon operation of the pump mechanism of this invention oil is directed into the passage 76' of the four-way valve 82. With the two landed valve spool 103 of the four-way valve in the position of FIGURE 8, the flow of oil in the passage 76' is diverted immediately to the lubricant line L1. It should be noted that as passageways 148 and 154 are in communication with passageway 76' and the lubricant line L1, these passages are also pressurized. Pressurization of passage 148 produces pressurization of passage 144 (to the left of FIGURE 8) to thus pressurize the left-hand expansion chamber 142 of the four-way valve 82. Pressurization of the left-hand chamber 142, of course, maintains the left-hand position of the two landed valve spool 103 as shown in FIGURE 8. During initial operation of the lubricating station of this invention the pressure in the line L1 and also in the passage 154 is not sufficient to overcome the spring constant of the over-center detent mechanism of the reversing valve 90. Therefore, pressurization of passageway 154 (which produces a force acting on the land 164) will not cause a movement of the four landed valve spool of the reversing valve 90 until a predetermined pressure is reached.

With the four-way valve and the reversing valve in the position of FIGURE 8, flow of lubricant is from the passageway 76' into the lubricant line L1. This flow continues until the measuring valve (not shown) discharges its rated quantity of lubricant. Thereafter, pressure in lubricant line L1 increases until the spring constant of the over-center detent mechanism is overcome. At this time, pressure in passage 154 causes the four landed valve spool of the reversing valve 90 to shift to the right-hand position.

It should be pointed out that prior to the shift of the reversing valve spool, the lubricant line L2 is in communication with the relief passageway 84'. Thus, any flow of lubricant from the line L2 into the four-way valve 82 will be diverted to the relief passageway 84' and thereafter into the reservoir.

After the shift of the four landed valve spool of the reversing valve 90, pressure in the passage 148 is diverted to the passage 144 to the right of FIGURE 8 and thereafter into the expansion chamber 142 on the right side of the four-way valve 82. The two landed valve spool 103 of the four-way valve 82 is thus shifted to the right-hand position of FIGURE 8. A shift to the right of the two landed valve spool will cause lubricant in the left expansion chamber 142 to be extruded back into the left passage 144. This lubricant will pass between the lands 164, 166 and will be diverted into the passage 150. It should be kept in mind that the two landed valve spool 103 of the four-way valve 82 is hollow and thus lubricant under pressure in the passage 150 may pass through the entire length of the two landed valve spool in order to be diverted to the relief passage 84' leading to the reservoir.

Thus, a shift of the reversing valve to the right-hand position of FIGURE 8 produces a shift of the two landed valve spool 103 of the four-way valve 82 to the right-hand position of FIGURE 8. Thereafter, the flow of lubricant is from the inlet 76' to the lubricant line L2. While lubricant line L2 is pressurized, any flow of lubricant from line L1 back into the four-way valve 82 will be directed through the longitudinal passageway 120 of the hollow spool 103 to the relief passage 84' leading to the reservoir.

With lubricant flowing from the inlet 76' to the lubricant line L2 the positive displacement measuring valves will discharge their rated amounts of lubricant. Thereafter, with an increase in pressure in the lubricant line L2 the spring constant of the over-center detent mechanism of the reversing valve 90 will be overcome and the reversing valve will shift back to the position shown in FIGURE 8. Cycling in this manner will thus continue until the source of electrical power to the pumping unit is disconnected. In the preferred embodiment as shown in FIGURE 8, the limit switch 102 may be used to break electrical contact with the pump to thus shut down the entire system. Limit switch 102 is activated by the projection 126 on the piston 122 abutting the roller 130 of the limit switch. As was previously pointed out a single limit switch such as is shown in FIGURE 8 may be utilized. Alternately, a pair of limit switches may be utilized at each end of the four-way valve. The limit switch, thus, may be used to sense a half cycle of operation (i.e. a movement of the two landed piston from left to right or from right to left), a full cycle of operation (i.e. a back and forth movement of the two landed piston), or a multiple cycle (a plurality of back and forth movements).

It should be noted that whenever the two landed valve spool 103 of the four-way valve 82 moves from one position to another, some provision must be made for expelling lubricant from one of the expansion chambers 142. Similarly, whenever pressurized lubricant is fed to one of the lubricant lines (either L1 or L2), some provision must be made to provide a relief passage for the nonpressurized lubricant line (L2 of L1 respectively). The hollow two landed valve spool 103 of the four-way valve makes it possible to utilize a single relief passage 84'.

Thus, whether lubricant is expelled to passage 84' directly as through passage 152 or whether lubricant is expelled from passage 150 through the hollow two landed valve spool, the same relief passage 84' is utilized. The provision of a passageway 120 through the two landed valve spool thus eliminates the necessity for an additional relief port at the opposite end of the valve block.

Attention is now directed to FIGURE 4 wherein a ball relief valve 108 is shown. This ball relief valve generally comprises a screw 196, a spring 192 and a ball 194. It will be noted that passage 198 provides direct communication between the inlet passageway 76' and the ball 194. Therefore in the event of any malfunction of the reversing valve or the four-way valve, a predetermined pressure will cause ball 194 to become unseated providing a relief through the passageways 198, 200 to the relief passage 84' via the longitudinal passageway 120 in the hollow two landed valve spool 103.

As was previously pointed out the reversing valve 90 is bolted to the under portion of the four-way valve 82. For proper orientation, note that in FIGURE 5 face 202 of the reversing valve body 160 is disposed adjacent face 204 (see FIGURE 3) of the mounting bracket 62. Due to the projecting gland 182, a recess 190 is provided in face 204 of the mounting bracket 62. Recess 190 may be more clearly seen in FIGURE 2.

SOLENOID OPERATED FOUR-WAY VALVE

The four-way valve discussed thus far in connection with FIGURE 4 is hydraulically actuated. The four landed valve spool of the reversing valve 90 of FIGURE 4 senses an increase in line pressure such that when the spring constant of the over-center detent mechanism is exceeded the reversing valve shifts to redirect pressurized fluid to the opposite expansion chamber to thereby shift the four-way valve spool 103. In FIGURE 9 there is shown a four-way valve operated by a solenoid which may be responsive to a pressure switch inserted in the lubricant line. For simplicity much of the porting in the valve body 92 of FIGURE 9 has been omitted. Disposed within the valve body 92 of FIGURE 9 (as in FIGURE 4) is a two landed valve spool 103 having lands 104, 106. Secured to either end of the valve spool 103 of FIGURE 9 are spool extensions 110, 112. Unlike FIGURE 4, however, there is no end cap at the left-hand side of the valve body 92 of FIGURE 9, and the spool extension 110 passes through a seal cartridge 206. An O-ring 208 may be disposed on the external surface of cartridge 206 to provide sealing between the cartridge and the valve body 92. Similarly an O-ring 210 may be provided in a counterbore of the seal cartridge in order to provide sealing at the spool extension 110. End cap 211 secured to valve body 92 retains the seal cartridge in place. As shown in FIGURE 9, a return spring 212 is disposed between the seal cartridge 206 and land 104 of the valve spool 103. A retaining washer 214 is provided between the return spring 212 and the seal cartridge 206.

At the right-hand end of FIGURE 9, a seal cartridge 216 is provided. As with seal cartridge 206, O-rings 208 and 210 are used to provide sealing between the seal cartridge 216 and the valve body 92 and the spool extension 112. At the end of the spool extension 112 there is provided a plunger 218 slidable within the solenoid field 220. A cover 222 may be provided to both support and protect the solenoid. A suitable lead 224 is provided for connection to an appropriate electrical source.

It should be noted that the two landed spool 103 of FIGURE 9 is identical to the two landed spool of FIGURE 4. The spool rod defining extensions 110, 112 is connected to the spool by means of a suitable roll pin. When using a solenoid as a means of operation of the four-way valve spool many of the passages previously described with reference to FIGURE 4 may be eliminated. Considering the schematic representation of FIGURE 8, a valve body 92 of a solenoid operated valve will require only passages corresponding to 76', 84', L1 and L2 of FIGURE 8.

The solenoid of the embodiment of FIGURE 9 is a push type. Thus, energization of the solenoid field creates a force on the plunger 18 tending to move the plunger to the left of FIGURE 9 thereby compressing spring 212. Upon de-energization of the solenoid field, the return spring 212 (previously compressed) acts on the land 104 to move the two landed spool to the right or to the position as shown in FIGURE 9. Spool extension 110 in protruding through the seal cartridge 206 may be utilized as an abutment means to activate a suitable limit switch (not shown) disposed adjacent the left-hand side of the valve body 92 of FIGURE 9. It will be recognized that an alternate construction of FIGURE 9 could employ two solenoids, one mounted on each side of the valve body 92. This type of construction will eliminate the need for the return spring 212. By elongating one of the spool extensions 110, 112 (such that the extension could pass through the case 222 of the solenoid) provision could be made to activate a limit switch.

Figures 25, 27, 27A:
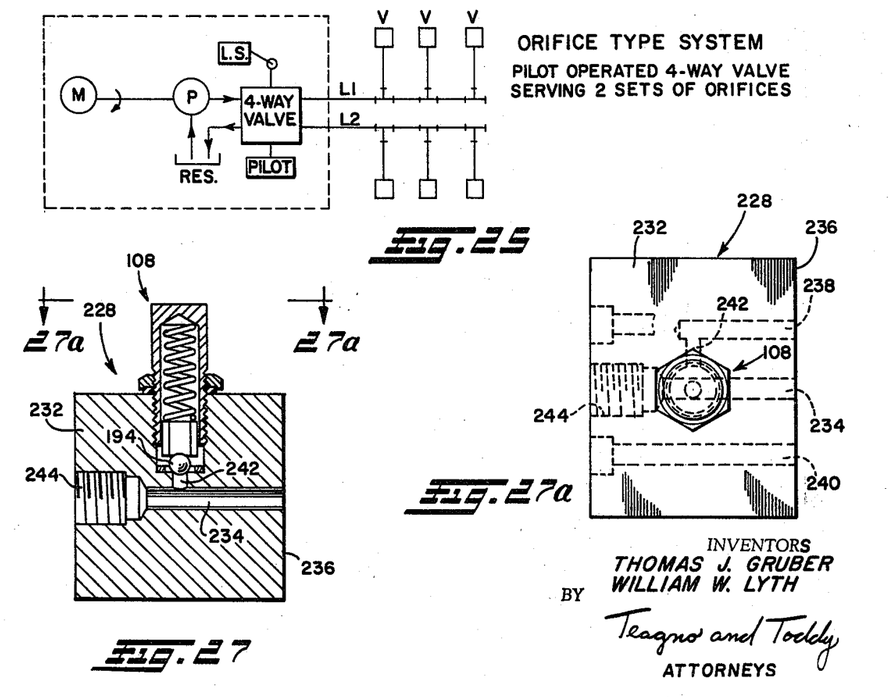

DESCRIPTION OF ONE-LINE RELIEF VALVE BODY (FIGURE 27)

FIGURE 27 is a cross-sectional view of a line relief valve body 228 that is used in lieu of the four-way valve 82 and attached reversing valve 90 of FIGURE 4 when adapting the universal pumping station of this invention for use with the one-line type of positive displacement valve. FIGURE 27a is a top elevational view of the valve block 232 of FIGURE 27. As shown in FIGURES 27 and 27a, valve block 232 generally includes a central passageway 234 extending therethrough. As shown in FIGURE 27a, passageway 234 opens at the face 236 of valve block 232. It is to be understood that face 236 of the valve block 232 is mounted to the mounting bracket 62, FIGURE 3, such that passage 234 overlies passage 76 of the mounting bracket 62. A relief passage 238 is also provided in the valve block 232, which relief passage 238 overlies passage 84 of the mounting bracket 62 (see FIGURE 3) when the valve block 232 is bolted to the mounting bracket 62 by means of fasteners extending through the fastener holes 240 of the valve block 232 and subsequentially threaded into engagement with the tapped holes 88 of the mounting bracket 62. As with the four-way valve of FIGURE 4, a ball relief valve 108 is provided in the valve block 232 in order to relieve excessive lubricant pressure in the passageway 234. Note that in the event that ball 194 becomes unseated due to the presence of high lubricant pressure, a relief passage is provided for the lubricant through passageway 242 interconnecting with passageway 238 and passageway 84 (see FIGURE 3) leading to the relief pipe 86. A threaded bore 244 is provided in the front portion of the valve block 232 in order to receive an appropriate tube coupling securing a lubricant line leading from the positive displacement type one-line manifold to the valve block 232.

The one-line relief valve body 228 of FIGURE 27 is thus to be considered an attachment to the oil pumping station of this invention. In the event that a parallel type lubrication system is utilized requiring a pair of lubricant lines leading from the pumping unit to the positive displacement measuring valve, then a four-way valve 82 (FIGURE 4) is bolted to the mounting bracket 62. The four-way valve 82 may be operated either by a reversing valve 90, as shown in FIGURE 4, or a solenoid as is shown in FIGURE 9. In the event that a one-line series type system is utilized employing a one-line positive displacement valve, then the one-line relief valve body 228 of FIGURE 7 is bolted to the mounting bracket 62 in lieu of the four-way valve 82 of FIGURE 4.

FLEXIBILITY OF THE INVENTION

Reference will now be made to FIGURES 11 through 25 wherein there is shown various schematic representations of the adaptations of the oil pumping station of this invention to various types of positive displacement measuring valve systems.

Throughout the discussion of FIGURES 11 through 25 the following nomenclature will be used:

T—Timer.
M—Motor.
P—Pump.
LS—Limit Switch.
R—Reservoir.
V—Metering Valve.
RV—Reversing Valve.
PS—Pressure Switch.
SOL—Solenoid.
PILOT—Hydraulic Reversing Valve (90 FIGURE 4).
L—Lubricant Line.
OLB—One-line Block (FIGURE 27).

Figure 11:
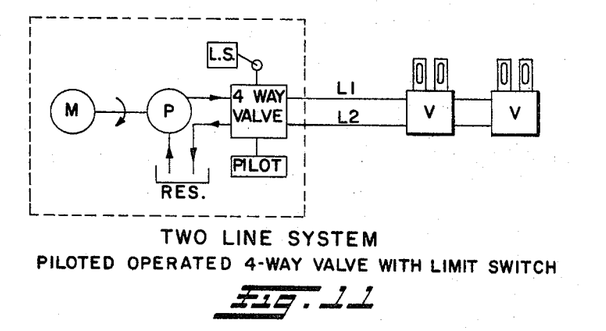

In FIGURE 11 there is shown a standard two-line system employing metering valves V and a pair of lubricant lines L1, L2. In this system the motor drives the pump which draws lubricant from the reservoir and pumps same to the four-way valve. Oil under pressure is directed through line L1 to the metering valves. After all bearings served by line L1 have been satisfied, line pressure builds up and actuates the flow reversing valve or pilot. This operation trips the limit switch, stopping the pump. One half of the lubricating cycle is now complete. Actuation of the timer control repeats the above sequence this time serving line L2.

Figure 12:
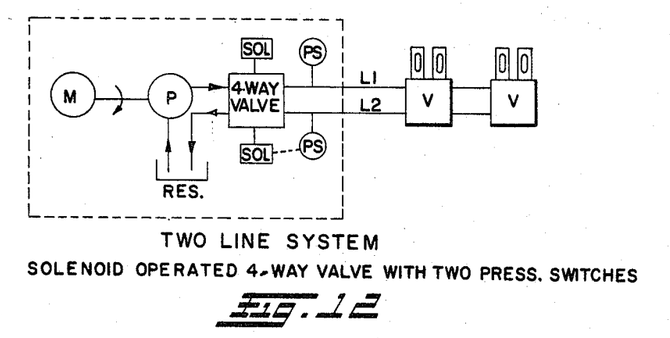

In FIGURE 12, the operation is similar to that of FIGURE 11 with the exception that the pilot or hydraulic reversing valve has been eliminated in favor of a pair of solenoids and a pair of pressure switches. Thus, the motor drives the pump which directs oil under pressure to line L1 to the metering valves. After all bearings served by line L1 have been satisfied, line pressure builds up and actuates the pressure switch of line L1. The pressure switch thereafter activates the solenoid to shift the four-way valve and at the same time stop the pump. One half of the lubricating cycle is now completed. When the timer reactivates the system, the operation is repeated with the sequence serving line L2.

Figure 13:
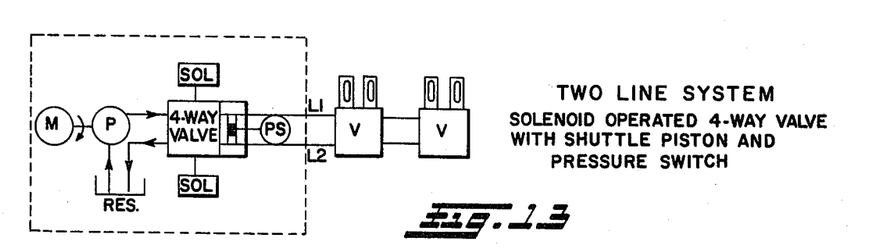

In FIGURE 13, the operation is much the same as with FIGURE 12 with the exception that a single pressure switch is utilized in conjunction with a shuttle piston 226. Thus, oil under pressure is directed through line L1 to the metering valves. The shuttle piston 226 is pushed downwardly in FIGURE 13 under the influence of pressure in line L1 thereby exposing the pressure switch to pressure in line L1. After all bearings served by line L1 have been satisfied, line pressure builds and actuates the pressure switch which in turn activates the solenoid to both shift the position of the four-way valve and to stop the pump and reset the timer. One half the lubricating cycle is now complete. When the timer reactivates a pumping cycle and repeats the above sequence, line L2 is thus served. Pressure in line L2, however, forces the shuttle piston 226 upwardly thereby exposing the pressure switch to pressure in line L2. Thus, the necessity for a pair of limit switches as in FIGURE 12 has been eliminated with the incorporation of a shuttle piston 226.

Figure 14:
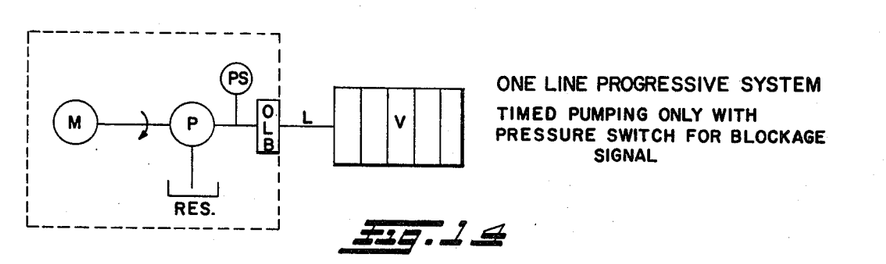

In FIGURE 14, the adaptation of the invention to a one-line progressive system is shown. Thus, with the four-way valve 82 and the reversing valve 90 of FIGURE 4 removed from the mounting bracket 62 and with the substitution of the one-line block 228 (FIGURE 27), the pumping station of this invention may be utilized to operate with a measuring valve of the one-line progressive design. Thus, in FIGURE 14 the timer control activates the motor which in turn causes the pump to direct oil under pressure to the lubricant line L connecting the primary manifold. The manifold will continue cycling for as long as the pump is activated. A pressure switch is located within the line L for the purpose of detecting a blockage in the line or at a bearing.

Figure 15:
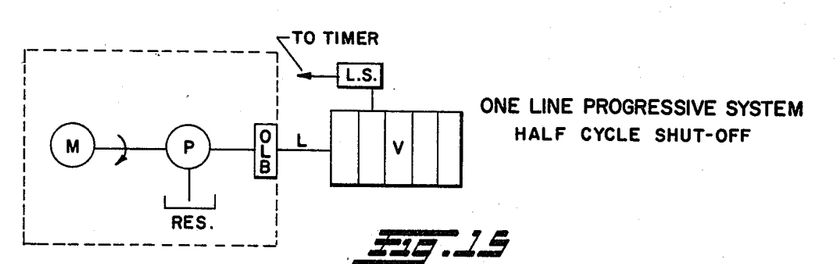

In FIGURE 15, a further refinement of FIGURE 14 is made through the incorporation of the limit switch at the measuring valve manifold. Thus, the motor driving the pump causes lubricant under pressure to be delivered to the manifold V producing a cycling of the manifold. The manifold will complete one half its discharge cycle and activate a limit switch which stops the pump and resets the timer control. One half the lubricating cycle is now complete. Upon reactivation of the timer the above sequence is repeated and the primary manifold V completes the second half of its discharge cycle. As with regard to FIGURE 14, the operation of FIGURE 15 utilizes a one-line block 228 (FIGURE 27) in lieu of the four-way valve 82 and reversing valve 90 of FIGURE 4.

Figure 16:
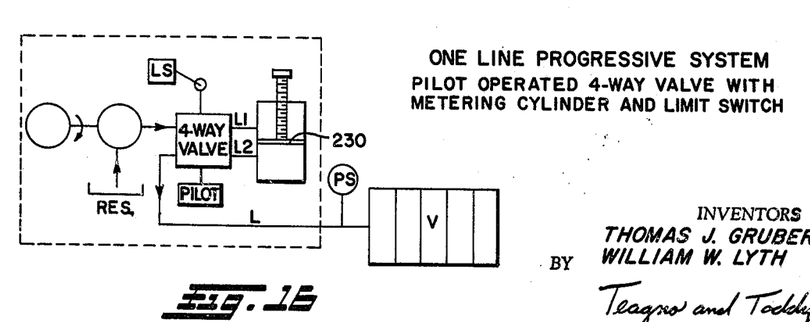

In FIGURE 16 there is depicted a system in which a one-line progressive valve manifold may be operated by means of a pilot operated four-way valve and a metering cylinder. In this system, oil under pressure is directed through line L1 to the metering cylinder forcing the metering piston 230 downwardly. Presuming that the metering cylinder was previously filled with lubricant, a downward movement of the metering piston 230 will force lubricant into the line L2, through the four-way valve, and subsequently into line L to activate the primary manifold V. When the metering piston 230 reaches its bottommost position in the metering cylinder, pressure begins to build up in the line L1. A predetermined pressure build up causes the reversing valve or pilot to shift thus tripping the limit switch. The limit switch signals the timing circuit to reset and to stop the pump motor. The pressure switch is utilized to detect a block line. A shift of the reversing valve or pilot also produces a shift in the four-way valve such that when the timer is reactivated lubricant line L2 will be activated thereby causing the metering piston 230 to rise in the metering cylinder forcing the lubricant into line L1 and thereafter into L. The sequence previously described is thus repeated.

Figure 17:
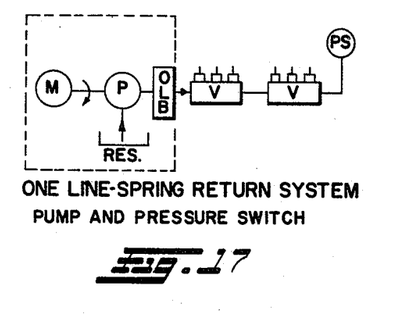

In FIGURE 17, a one-line spring-return system utilizing a pump and pressure switch is shown. As with FIGURE 14, the arrangement of FIGURE 17 requires the substitution of the one-line block 228 (FIGURE 27) for the four-way valve 82 and reversing valve 90 of FIGURE 4. In FIGURE 17 the timer control starts the pump motor to thereby direct oil under pressure to the valve V. The valves thereafter discharge oil to the various lubrication points. After discharge of the valves, pressure begins to build in the system and when a predetermined pressure is reached, the pressure switch is tripped signaling the timing circuit to stop the pump motor and reset the timer. After shutting off, the pump is relieved internally to the reservoir.

Figure 18:
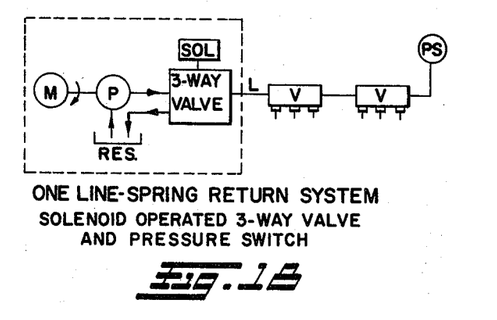

In FIGURE 18, a one-line spring-return system is shown utilizing a solenoid operated three-way valve and a pressure switch. The four-way valve as shown diagrammatically in FIGURE 8 may be modified to a three-way valve by simply plugging either of the passages L1 or L2. In the operation of the system of FIGURE 18 the timer starts the pump motor to direct oil under pressure through lubricating line L to the measuring valves V. The valves subsequently discharge oil to the various lubrication points. Upon completion of the discharge cycle, pressure begins to build up in the system. After a predetermined pressure is reached the pressure switch is tripped signaling the timing circuit to stop the pump motor and also signaling the solenoid to shift the position of the valve spool thereby connecting the pump outlet to the reservoir to thus relieve the system.

Figure 19:
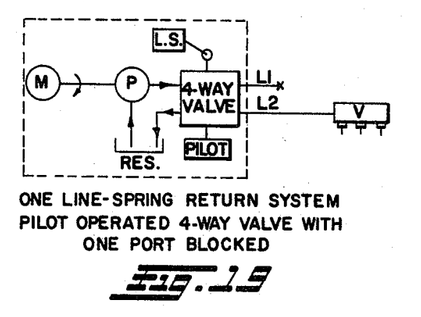

In FIGURE 19, a one-line spring-return system operating in conjunction with a pilot operated four-way valve and a limit switch is shown. It will be noted that line L1 of FIGURE 19 is blocked and the measuring valve V is connected to the lubricating line L2. Upon activation of the timer of FIGURE 19, the pump causes pressure to build up in the blocked line L1 producing a shift of the pilot valve and the four-way valve. Oil under pressure is thereafter directed through the line L2 to the measuring valve V. The valve subsequently discharges oil to the various lubrication points after discharge pressure begins to build up in the system. Upon reaching a predetermined pressure the reversing valve or pilot shifts thereby tripping the limit switch. The limit switch signals the timing circuit to stop the pump motor.

Figure 20:
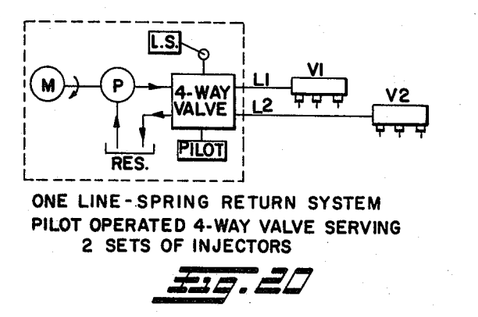

In FIGURE 20 the operation of the system is identical to that of FIGURE 19 with the exception of a second set of measuring valves being added to the lubricant line L1 in lieu of the blockage that was provided in FIGURE 19. Thus, in FIGURE 20 the timer starts the pump motor to thereby supply oil under pressure to line L1 supplying measuring valves V1. Valves V1 subsequently discharge oil to the various lubrication points. After discharge, pressure begins to build up in the system and after reaching a predetermined value the reversing valve is caused to shift thereby tripping the limit switch. The limit switch signals the timing circuit to stop the pump motor and reset the timer after a shift of the four-way valve. Upon reactivation of the timer a second cycle takes place serving the lubricant line L2 and the measuring valves V2.

Figure 21:
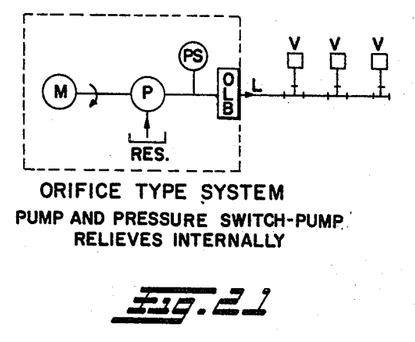

FIGURE 21 is similar to FIGURES 17 and 14 in that a one-line system is utilized in conjunction with a pump, motor and pressure switch. Thus, in FIGURE 21 the timer starts the pump motor directing oil under pressure to various orifices of the valves V. During pressure build up in the system the orifices discharge oil to the various lubrication points. Upon reaching a predetermined value, pressure in the line L trips the pressure switch signaling the timing circuit to reset and stop the pump motor. As with FIGURES 17 and 14 the one-line block 228 of FIGURE 27 is utilized in the pumping station of this invention in place of the four-way valve 82 and the reversing valve 90.

Figure 22:
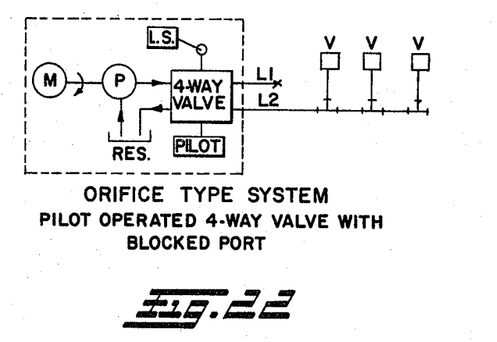

FIGURE 22 shows an orifice type system operating in conjunction with a pilot operated four-way valve with a blocked port. In FIGURE 22 the timer starts the pump motor causing a pressure build up in the blocked line L1. This pressure build up causes the reversing valve to shift thereby directing oil under pressure through the lubricating line L2 to the orifice of the various valves V. During a pressure build up in the line L2 the various orifices discharge oil to the lubrication points. Upon reaching a predetermined pressure the reversing valve is caused to shift thereby tripping the limit switch. The limit switch signals the timing circuit to reset and stop the pump motor.

Figure 23:
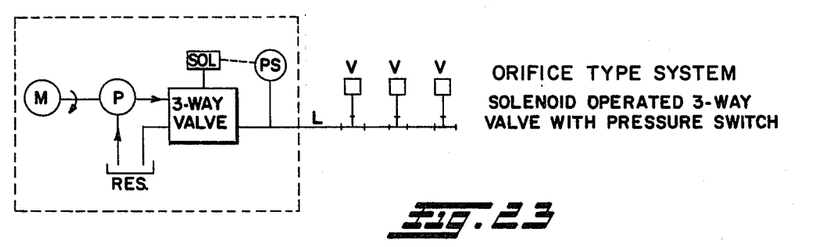

In FIGURE 23 there is shown an orifice type system utilizing a solenoid operated three-way valve with a pressure switch. As with FIGURE 18, a three-way valve may be assembled from the four-way valve of FIGURE 8 by plugging either one of the lubricant passages L1 or L2. In FIGURE 23, the timer starts the pump motor to direct oil under pressure to the lubricant line L and thereafter to the orifices in the valve V. During pressure build up in the line L the orifices discharge oil to the lubrication points. Upon reaching of a predetermined value, line pressure trips the pressure switch signaling the timing circuit to reset the timer, stop the pump motor and shift the three-way valve spool by means of the solenoid.

Figure 24:
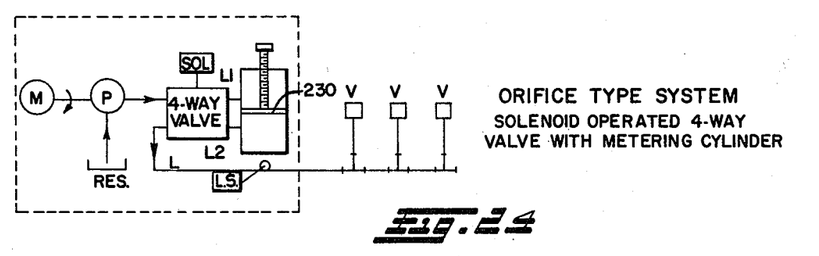

In FIGURE 24 an orifice type system is shown utilizing a solenoid operated four-way valve in conjunction with a metering cylinder. FIGURE 24 is similar to FIGURE 16. The timer starts the pump motor which directs oil under pressure through the lubricant line L1 into the metering cylinder causing the metering piston 230 to be displaced downwardly in FIGURE 24. Upon reaching the bottom of the metering cylinder the metering piston 230 trips the limit switch which in turn activates the solenoid to shift the four-way valve to its second position. The pump motor is simultaneously stopped and the timer reset. Reactivation of the timer produces a similar sequence with respect to line L2. As with FIGURE 16, movement on the metering piston 230 up or down in FIGURE 24 extrudes lubricant into a respective line L1 and L2 and thereafter into the main line L feeding the orifices of the various valves V.

In FIGURE 25 an orifice type system is shown operating in conjunction with a pilot or reversing valve operated four-way valve. A first set of measuring valves V1 is shown connected to the lubricant line L1 and a second set of measuring valves V2 is shown connected to lubricant line L2. After the timer starts the pump motor of FIGURE 25, oil under pressure is directed to the first set of orifices of valves V1. Pressure build up in the system produces a discharge of oil from the orifices to the lubrication point. Upon reaching a predetermined value the pressure switch causes the reversing valve to shift thereby tripping the limit switch signaling the pump motor to stop and the timer to be reset. Reactivation of the timer produces a similar sequence as noted above with respect to the lubricant line L2 feeding the valves V2.

SUMMARY OF FIGURES 11 THROUGH 25

The schematic representations of FIGURES 11 through 25 were designed to show how the oil pumping station of this invention may be operated in conjunction with parallel, series, spring return, and orifice type systems. FIGURES 11 through 25 demonstrate how the basic automatic oil pumping station components may be assembled with different types of positive displacement type measuring valves to produce either parallel, series, spring return, or orifice type systems. Previously unknown flexibility is now achieved with the pumping station of this invention in that the station may be adapted to the measuring valves of virtually any source of manufacture. Thus, the previously well defined lines between the various types of systems such as the parallel, series, spring return, and orifice systems is now diminished in view of the fact that a single automatic pumping station may be utilized to operate any of the systems. Use of the hydraulic reversing vale (or a solenoid) in conjunction with the four-way valve renders the station suitable for use with all parallel or spring return type systems. By simply removing four bolts and replacing the four-way valve and the hydraulic (or solenoid) operator with a special one-line relief block converts the basic unit into a one outlet system for one-line or series type measuring valves. All other components are standard for the various types of systems.

TIMER CONTROL

Reference is now made to FIGURE 26 wherein there is shown an elementary wiring diagram of the timer control of the oil pumping station of this invention. The timer control is mounted as an assembly for simple bolt on attachment to the case 32 of the pumping station 30 (see FIGURE 1). As was previously pointed out the timer control package of this invention may be installed behind the front panel 38 (see FIGURE 1) of the pumping station as is shown diagrammatically at 54 of FIGURE 1.

The sequence of operation of the timer control will now be described with reference to FIGURE 26. The basic elements of the timer control are as follows:

(1) An off-delay timer mechanism having two switches, one "cycle" switch TR–1B, which initiates the pumping cycle, and one "signal" switch TR–1A, which closes 8% of the timer full dial range after the "cycle" switch first operates—if the system fails to complete its normal cycle within this 8% timing interval allowance.

(2) A machine control or signal relay CR–1 having a single normally open contact held closed across the timer switch signal contact which also maintains power to the timer motor.

(3) A 2-pole normally open 10 amp motor contactor relay 1M, rated for ⅙ horsepower starting at 115 volts.

(4) A 2-pole normally open time reset relay CR–2, rated at 10 amp, which is operated by the system cycle completion limit switch LS–1.

(5) A thermal overload (manual reset) in the pump motor power circuit.

(6) A 14-pole terminal block with twelve active contacts for connection of a power supply, fault light, test button, pump motor, and machine interlock contacts. Two (2) inactive terminal block points are provided for usage as required—such as connection of the lubricant low level switch.

The various steps in the operation of the timer will now be described with reference to FIGURE 26.

(a) A power supply (115 volts, 60 cycles) is connected to terminal points 301 and 302. The power supply is tapped from a machine control circuit which is energized whenever the machine is in operation.

(b) Power to the timer motor is carried across the normally closed timer "signal" switch TR–1A. The normally closed position of the "signal" switch TR–1A is that shown in FIGURE 26. The timer is of the off-delay type, meaning that its clutch is spring-engaged to the timing cam which operates the timer switches. Whenever power is applied to the timer, therefore, its motor turns the timing cam. Energizing the clutch, however, disengages the motor from the timing cam and the cam resets to the start-timing position by return spring action. Releasing the clutch then starts a new timing cycle.

(c) The "signal" switch timer contact TR–1A is arranged to open 8% of the full dial range after the "cycle" switch TR–1B contact operates. The TR–1A contact in opening, cuts out the timer motor, thereby preventing mechanical binding or damage to the timer switches, or motor burn out in the event the timer clutch is not energized to reset the timer.

(d) The machine control relay or signal relay CR–1 is energized in parallel with the timer motor. Thus, whenever the timer motor is energized, the CR–1 signal relay is energized. A normally open CR–1 contact is brought out to terminals 311 and 312 for use in a machine control circuit. Typically, this contact will be used in the machine circuit where, if it falls open the machine will complete the cycle in progress, but will not then start another cycle, thus calling attention to the fact that there is a fault in the lubrication system, or that the timer power has failed.

(e) The timer is available with a number of dial ranges, up to twelve hours. In the preferred embodiment a sixty minute range is taken to be the standard. The lubrication cycle frequency is adjustable between 10–100% of the full dial range by simply turning the dial selector knob to the desired timer interval.

(f) Presuming that a lubrication timing interval of fifteen (15) minutes has been preset on the dial (i.e. the pump will cycle the measuring valve each 15 minutes), the timer "cycle" switch TR–1B transfers after the expiration of the timing interval (i.e. 15 minutes) and energizes the motor contactor relay 1M. At this point the "signal" switch TR–1A will transfer 8% later if the timer switch is not energized.

(g) With the motor contactor relay 1M energized the pump motor starts and supplies lubricant to the lubrication line L1 or lubrication line L2 (if the four-way valve 82 and the reversing valve 90 of FIGURE 4 are used) or to the primary valve inlet of the one-line progressive type system (if the one-line block 228 of FIGURE 27 is used).

Figures 28, 28A, 28B:
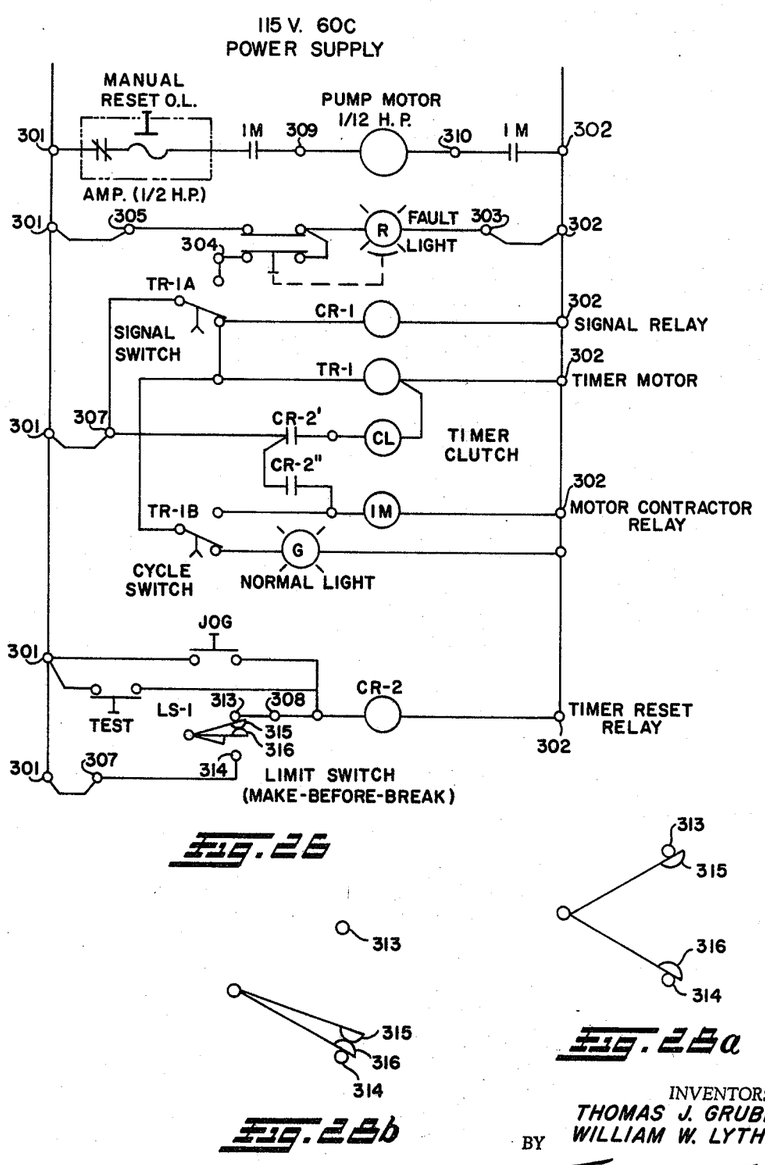
FIGURE 28a is a schematic view of the limit switch LS-1 of FIGURE 26 in the "make" position.
FIGURE 28b is a schematic view of the limit switch LS-1 of FIGURE 26 in the "break" position.

(h) *Two-line system.*—When all the positive displacement metering valves have discharged, pressure in the lubricant lines builds up and the reversing valve 90 of FIGURE 4 shifts. A shift of the reversing valve causes the four-way valve spool 103 to shift and projection 126 of piston 122 of FIGURE 4 to strike roller 130 of the limit switch to thereby trip the limit switch. In FIGURE 26 the limit switch is designated LS–1. LS–1 is a "make-before-break" type limit switch. The various positions of the "make-before-break" type limit switch are shown in FIGURES 26, 28a and 28b. In FIGURE 28a contact 316 of the limit switch has transferred to contact 314. While in this position contact 315 remains in contact with contact 313. FIGURE 28a illustrates the intermediate or "make" position of the limit switch. This is the position of the limit switch after the reversing valve shifts and the four-way valve spool 103 has partially shifted thereby tripping the limit switch to its "make" position. While in the position of FIGURE 28a, limit switch LS–1 completes the circuit between 307 and 308 of FIGURE 26 thereby energizing the timer reset relay, CR–2.

(h') *One-line system.*—In progressive type one-line systems that operate without the reversing valve 90 and four-way valve 82 of FIGURE 4 but rather utilize the one-line block 228 of FIGURE 27 in lieu thereof, the limit switch LS–1 of FIGURE 26 is positioned adjacent the one-line progresive manifold so as to be tripped when the manifold completes a one half cycle. At this point reference is made to the Higgens Patent No. 2,834,433 for a more complete discussion of the operation of the one-line progressive system. It is contemplated that the limit switch LS–1 might be disposed adjacent the manifold block A, FIGURE 1 of Higgens 2,834,433, so as to be tripped by the extension 2d of the piston 2. Thus, a single movement of the piston 2 of Higgens 2,834,433 from left to right will cause limit switch LS–1 to trip and thereby assume the "make" position of FIGURE 28a.

(i) With the limit switch in the position as shown in FIGURE 28a, the timer reset relay, CR–2, is energized to thereby perform two functions:

(1) A normally open contact CR–2' closes, energizing the timer clutch, thereby causing the timer to reset. At this point the "cycle" switch, TR–1B, returns to is original position with the timer motor disengaged from the timer cam.

(2) The second normally open contact CR–2" closes simultaneously with the closing of CR–2' thereby holding the motor contactor relay, 1M, closed or energized in spite of the resetting or return of the "cycle" switch, TR–1B, to the position shown in FIGURE 26.

(j) With the motor contactor relay, 1M, remaining energized due to the closing of CR–2", the pump continues to run until sufficient lubricating oil is delivered to the lubrication system so that the piston valve spool operating limit switch LS–1 completes its stroke, thereby tripping LS–1 to the "break" position as shown in FIGURE 28b.

(k) Limit switch LS–1 having now completed its "break" sequence, the timer reset relay CR–2 drops out causing the contacts CR–2' and CR–2" to fall open.

(l) With contact CR–2' falling open the timer clutch is released allowing the start of a new timing interval. With contact CR–2" falling open the motor contactor relay, 1M, is released to thereby stop the pump motor.

(m) One lubrication cycle is now complete. It should be noted at this point that the timer is designed to control all types of lubrication systems including two-line or parallel systems, one-line progressive, one-line spring-return, or one-line orifice systems. If a reversing valve and four-way valve combination is used such as is shown in FIGURE 4, the limit switch LS–1 is tripped by the extension 126 of piston 122 of the four-way valve. As was previously pointed out the reversing valve and four-way valve combination is utilized with parallel or two-line systems. By replacing the reversing valve and four-way valve with the one-line block 228 of FIGURE 27 the pumping unit is thereby converted to operate a single outlet or series type system. As is shown in FIGURE 15 the limit switch LS–1 of FIGURE 26 is disposed adjacent a valve manifold of the one-line progressive system so as to be tripped by an extension of a piston of the manifold.

An important component of the timing control circuit of FIGURE 26 is the limit switch LS–1 that actuates the off-delay type timer for recycling before completely opening the system. This is in contrast, for example, to the special recycling timers used in prior designs. The "signal" switch, TR–1A, of the off-delay timer operates 8% of the timing cycle after the activation of the "cycle" switch, TR–1B. The 8% time lag serves as a monitoring interval. The timer clutch, CL, must be activated during this 8% interval in order to prevent the "signal" switch, TR–1A, from tripping to thereby operate the fault light. The timer clutch, CL, will be energized only if the timer reset relay, CR–2, is closed. Timer reset relay, CR–2, operation depends upon completion of at least one half cycle of the lubricating valve.

FAULT WARNING SEQUENCE

As was previously pointed out failure of the limit switch LS–1 of FIGURE 26 to "make," as is shown in FIGURE 28a results in continued operation of the timing cam. Unless the limit switch LS–1 assumes the "make" position of FIGURE 28a, the "signal" switch, TR–1A, will open 8% of the timer dial range after the "cycle" switch, TR–1B, closes to start a pumping cycle. Typical duration times for a pumping cycle are ½% of the full dial range. Consequently, the 8% monitoring delay is more than adequate to allow for any variables that may occur during the pumping cycle. If the limit switch LS–1 does not assume the "make" position of FIGURE 28a, the "signal" switch, TR–1A, will time out to thereby activate the fault light and/or sound an alarm. Possible reasons for a time out of the TR–1A switch are as follows:

(1) Lubricant depletion (empty reservoir),
(2) Pump motor failure,
(3) Pump failure,
(4) Pump-to-motor coupling failure,
(5) Plugged suction strainer on pump,
(6) Oil viscosity too high—pump does not prime,
(7) Severe leakage in system,
(8) Limit switch LS–1 faulty or wires improperly connected to timer terminal strip,
(9) Timer reset relay, CR–2, faulty,
(10) Timer clutch faulty,
(11) Motor contactor relay, 1M, faulty,
(12) Cycle switch, TR–1B, faulty.

In addition to the above, a blocked bearing or broken main line in a one-line progressive system will produce a time out of the "signal" switch, TR–1A.

Annunciation of a fault may be accomplished as follows:

(1) "Signal" switch, TR–1A, energizes the red "fault" light located at 46, FIGURE 1.

(2) Upon energization of the red fault light the machine control relay or signal relay, CR–1, falls open dropping out a holding circuit in the machine being lubricated, thereby causing the machine to stop at the end of the machining cycle in progress.

(3) An alarm system may be utilized in conjunction with the fault light to warn of a fault.

(4) As shown in FIGURE 26 a normal light (green) may be activated by the "cycle" switch TR–1B in the passive position. During operation of the pump with TR–1B in the active position, the normal light will be out. In the event that the normal light does not come back on after a reasonable period of time (during which the pump is operating) then the operator is alerted to a fault in the system.

The timer having now called attention to a fault, makes its personnel inspect the system to locate the source of trouble. The timer can be reset only by operating the limit switch LS–1. This prevents machine operators from easily resetting the timer and making it mandatory to, therefore, call a maintenance man to locate and correct the source of trouble.

MODIFICATIONS OF THE TIMER CONTROL

The timer control of FIGURE 26 has been described in detail with regard to half cycle operation of the measuring valves. As previously noted the limit switch, LS–1, is first tripped to the "make" position of FIGURE 28a, as the valve spool projection makes initial contact with the limit switch trip arm. Further movement of the valve spool trips the limit switch to the "break" position of FIGURE 28b. These two positions of the limit switch (i.e. the "make" and "break" positions) have been assumed as the valve spool completes a one half cycle or a movement from left to right or vice versa.

Within the scope of this invention should be considered full cycle operation of the measuring valves by the timer control. Thus the limit switch, LS–1, could be initially tripped to the "make" position after completion of one half cycle and thereafter tripped to the "break" position after completion of a full cycle. Where a two-line system is used the discharge of the first set of measuring valves (connected to line L1) could trip the limit switch to the "make" position. The discharge of the second set of measuring valves (connected to line L2) could trip the limit switch to the "break" position.

This invention should not be considered as limited to the particular type of "make-before-break" limit switch disclosed in FIGURES 26, 28a and 28b. Thus a conventional open or closed position (single pole single throw) limit switch could be used. As an example a conventional limit switch could be positioned at both ends of the four-way valve 82 of FIGURE 4. Movement of the valve spool 103 from left to right would then trip the right limit switch to close contacts 313, 314 of FIGURE 26. Subsequent movement of the valve spool 103 from right to left would then trip the left limit switch to open contacts 313, 314. Thus a pair of conventional limit switches may duplicate the "make-before-break" operation of the limit switch LS–1 of FIGURE 26.

Alternately, a single conventional limit switch could be used. Thus the valve spool 103 in traveling from left to right would make contact with the limit switch trip arm and depress said arm to close contacts 313, 314. As the valve spool 103 reverses direction the limit switch trip arm would be released thereby opening the contacts 313, 314.

With reference to FIGURE 26, certain additional modifications are possible within the scope of this invention. Thus the timer clutch, CL, could be operated directly by the limit switch LS–1 rather than indirectly by the timer reset relay contact CR–2'. Similarly, the limit switch LS–1 could hold the motor contactor relay energized directly rather than through the use of a relay contact CR–2".

The machine relay CR–1 is optional and may be omitted if desired.

A third timer switch, TR–1C, may be used in lieu of the second relay contact, CR–2", to hold the motor contactor relay energized until LS–1 completes its "break."

Having thus described the preferred embodiment of the invention,

I claim:

1. A monitoring and control system for a centralized cyclic lubrication system employing a motor, a pump and one or more positive displacement type measuring valves, comprising:
   a timer for periodically actuating said motor and said pump to distribute lubricant to said measuring valves;
   a first timer switch coupled to said timer,
   clutch means coupled to said timer for resetting said timer,
   timed means to transfer said first timer switch from a passive position to an active position to thereby supply power to said motor for operating said pump of the lubrication system,
   means responsive to the completion of the lubrication cycle in said lubrication system for activating said clutch means to thus reset said timer to a start-timing position and to interrupt power to said motor.

2. The monitoring and control system of claim 1 in which said timer includes a second timer switch responsive to the passage of a predetermined timed interval after said first switch transfers from said passive position to said active position for terminating the operation of said timer and an alarm means activated by said second timer switch.

3. The monitoring and control system of claim 1 in which said means responsive to the completion of the lubrication cycle is further defined by an extension of a piston of one of said measuring valves and a limit switch for terminating operation of said motor positioned adjacent said extension wherein operation of said measuring valve triggers said limit switch.

4. The monitoring and control system of claim 1 in which said means responsive to the completion of the lubrication cycle is further defined by a flow control valve positioned between said pump and said measuring valve and having a spool with an extension on one end thereof, and a limit switch positioned adjacent said extension for terminating the operation of said motor in response to actuation by said extension.

5. The invention of claim 4 in which said flow control valve is pilot operated.

6. The invention of claim 4 in which said flow control valve is solenoid operated.

7. A monitoring and control system for a centralized lubrication system employing a motor, pump, and one or more positive displacement type measuring valves, comprising:
   an off-delay timer mechanism having a timer motor, a timer cam and a first cycle switch, said timer mechanism periodically transferring said first cycle switch from a passive position to an active position to initiate motor and pump operation,
   a clutch spring-engaged to the timer cam which operates said first cycle switch whereby when power is applied to the timer motor the timer cam is rotated, said clutch disengaging the timer cam from the timer motor to reset said cam to the start-timing position by return spring action in response to energization thereof,
   a make-before-break type limit switch coupled to said timer mechanism, said limit switch having a make position to energize the timer clutch causing the timer to reset and to simultaneously initiate the motor and pump operation,
   means responsive to the flow of lubricant for actuating said make-before-break switch to the make position,
   means responsive to the further flow of lubricant in said lubrication system for actuating said limit switch to the break position for releasing said timer clutch to start a new timing interval and simultaneously stopping said motor and pump operation.

8. The monitoring and control system of claim 7 in which said off-delay timer includes a second signal switch responsive to the passage of a predetermined timed interval after said first cycle switch transfers from said passive position to said active position but before said timer clutch is energized, and an alarm means activated by said second signal switch.

9. The invention of claim 7 further comprising a machine control relay which is held energized in parallel with said timer motor whereby said machine control relay is energized in response to timer motor energization and said machine control relay will terminate the operation of the machine being lubricated in response to a power failure to said timer motor.

10. A lubricating oil pumping station for centralized lubrication systems of the parallel, series, or series spring-return type which employ positive displacement type measuring valves to proportion lubricant to bearings or the like, comprising:
   (1) a reservoir chamber for lubricating oil,
   (2) a suction strainer mounted in said reservoir,
   (3) a lubricating oil pump connected to said strainer,
   (4) an electric motor drivingly connected to said pump,
   (5) a mounting bracket,
   (6) a four-way two position fluid control valve releasably attached to said mounting bracket, said four-way valve including
(a) an inlet port,
(b) a first outlet port,
(c) a second outlet port,
(d) a relief port,
(7) conduit means to conduct lubricating oil from the discharge of said pump to said mounting bracket,
(8) passageway means in said mounting bracket to conduct lubricating oil from said conduit means to said inlet port of said four-way valve,
(9) relief conduit means to conduct lubricating oil from said relief port of said four-way valve to said reservoir,
(10) means to shift said four-way fluid control valve to alternately connect said inlet port with said first and second outlet ports while alternately connecting said second and first outlet ports respectively with said relief port,
(11) control and monitoring means to selectively operate said electric motor, to thereby pump lubricant to said measuring valves.

References Cited

UNITED STATES PATENTS

| | | | |
|---|---|---|---|
| 2,305,455 | 12/1942 | Nemetz | 184—7 |
| 2,787,336 | 4/1957 | Thomas | 184—27 |
| 3,038,557 | 6/1962 | Callahan | 184—7 |
| 3,209,814 | 10/1965 | Block | 165—14 |
| 3,286,793 | 11/1966 | Bricout | 184—7 |
| 3,330,380 | 7/1967 | Fujita | 184—7 |

FOREIGN PATENTS 1,184,430  2/1959  France.

FRED C. MATTERN, Jr., Primary Examiner

MANUEL ANTONAKAS, Assistant Examiner

U.S. Cl. X.R.

184—27